May 21, 1957  J. W. POKORSKI  2,792,883
DIE CUTTING PRESSES AND CUTTING SURFACES
Filed July 26, 1955  2 Sheets-Sheet 1

Inventor
Joseph W. Pokorski
By his Attorney

May 21, 1957 — J. W. POKORSKI — 2,792,883
DIE CUTTING PRESSES AND CUTTING SURFACES
Filed July 26, 1955 — 2 Sheets-Sheet 2
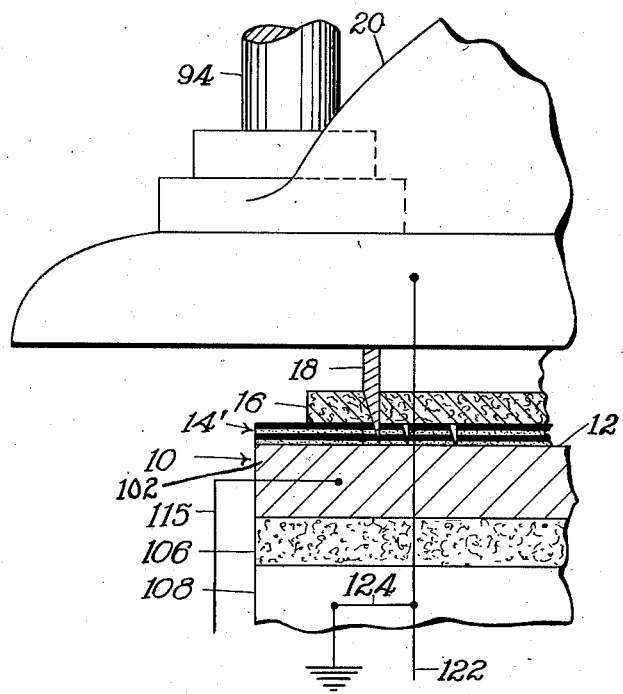
Fig. 2
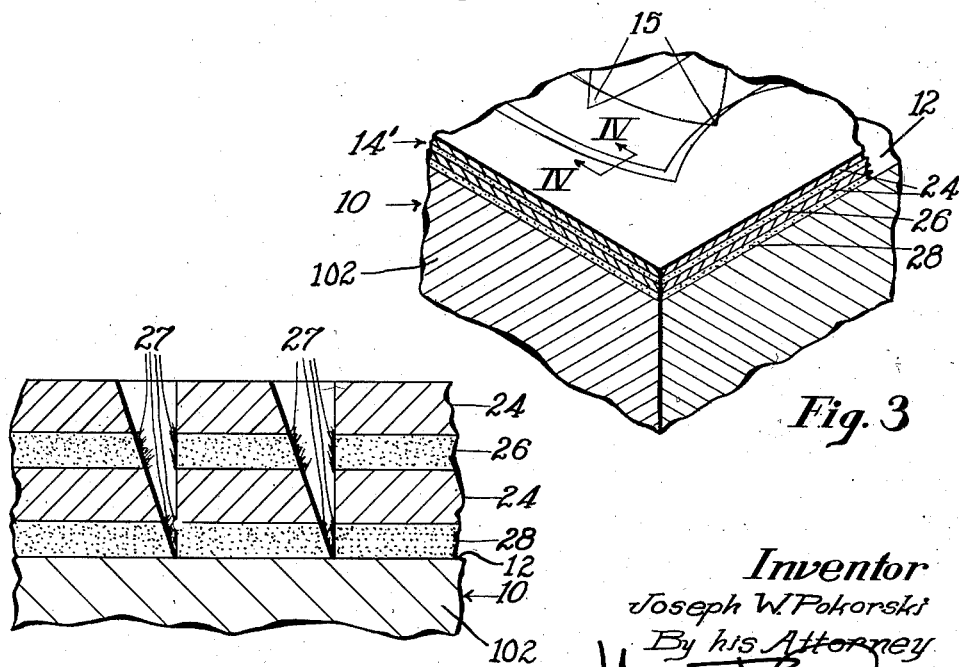
Fig. 3
Fig. 4
Inventor
Joseph W. Pokorski
By his Attorney

United States Patent Office 2,792,883
Patented May 21, 1957

2,792,883

DIE CUTTING PRESSES AND CUTTING SURFACES

Joseph W. Pokorski, Lynnfield, Mass., assignor to United Shoe Machinery Corporation, Boston, Mass., a corporation of New Jersey Application July 26, 1955, Serial No. 524,516

5 Claims. (Cl. 164—23)

This invention relates to presses and more particularly to improvements in presses of the type commonly known as clicking machines, for use in cutting blanks from sheet material.

In the application of Frank Seabury, II, and Robert W. Bradley, under the title "Presses for Cutting Blanks From Sheet Material," Serial No. 409,670, filed Feb. 11, 1954, there is disclosed a press of the clicking machine type provided with an electric control arrangement for controlling the pressure stroke of the press. That machine comprises a work support in the form of a cutting block having an electrically conductive portion and power means for effecting relative movement of the work support and platen, controlled by an electric circuit which includes the work support. The platen and the die employed in the press are composed of electrically conductive material and the control circuit passes through the platen, die and conductive block. As shown in that application, the platen is actuated by hydraulic mechanism including a solenoid operated valve for controlling the direction of the flow of fluid to act upon a piston connected to a spindle upon which the platen is mounted. This solenoid is controlled by the above-mentioned electric circuit and is so constructed and arranged that when the platen has forced the die through a workpiece and into contact with the block, the electric control circuit will be completed and the valve will be operated to effect movement of the platen in a direction away from the block.

This mechanism provides an automatic control for the length of stroke of the platen such that the platen is moved away from the block shortly after the penetration of the work by the die. Thus the platen will be caused to engage the die and force it through the work to complete the cutting action entirely independently of the thickness of the work or the height of the die.

This form of press has been found very useful and has resulted in faster and better cutting, and in longer life both of the dies and of the cutting block since penetration of the die into the block is closely controlled. A disadvantage of the block, however, is the inherent difficulty of cutting conductive workpieces such as metal sheets and of performing successive cuts in the same place even with non-conductive workpieces as for example might be required where unevenness of a die or of the surface of the cutting block had resulted in an incomplete severance of a blank from the sheet from which it is being cut. In such cases, since conductive workpieces to be cut complete the control circuit or portions of the die which have passed through the material to be cut come in contact with the conductive surface of the cutting block and complete the electric control circuit through the platen, die and cutting block, cutting of conductive workpieces or further cutting of non-conductive workpieces requires special adjustment of time delay elements of the press.

It is a feature of the present invention to provide an improved press of the type referred to including an electric control of the stroke of the platen and in which the aforementioned disadvantage is eliminated and an improved cutting action is obtained.

The press of the present invention, like the press of the aforementioned application of Seabury and Bradley, includes a die and platen of electrically conductive material, the platen being mounted for movement toward and away from a cutting surface in producing pressure applying operations upon the die. A power device, suitably a hydraulic mechanism, is provided for reciprocating the platen; and a device for initiating operation of the power source, for example a solenoid operated valve for controlling the direction of flow of fluid in a hydraulic mechanism, is provided to initiate movement of the platen toward and away from the cutting surface. In the present case, however, the work support, for example the cutting surface, includes a dielectric layer secured on a support member having an electrically conductive surface portion. This dielectric layer insulates the die from the electrically conductive surface portion of the support member but is penetrable by the die under pressure applied by the platen in a pressure applying operation. The electric control circuit becomes complete and operative to reverse the direction of movement of the platen only after the die has been forced through the dielectric layer into contact with the electrically conductive surface portion of the support member. The introduction of this dielectric layer insures that, for example in a die cutting operation, the cutting edge of the die will pass at least a limited distance completely through a workpiece. Also the dielectric layer makes it possible to cut conductive materials and to make repeated cuts when that is necessary since the dielectric layer will insulate the die from control circuit-completing relation with the conductive surface portion of the support member.

In a preferred embodiment of the present invention, the dielectric layer comprises two or more laminae of tough, fibrous sheet material held together by a film or films of a pressure-sensitive adhesive and secured to the electrically conductive surface of the support member by an allover coating of adhesive which also desirably is of the pressure-sensitive type.

The invention will be described more fully in conjunction with the accompanying drawings forming part of the disclosure of the present application. In the drawings, Fig. 1 is a side elevation, partly in section, of a portion of a press embodying one form of my invention and includes a diagrammatic view showing a solenoid valve control mechanism and an electric circuit therefor;

Fig. 2 is a vertical cross section on an enlarged scale through a portion of the machine illustrating the relation of the work support to the die and work supported thereon;

Fig. 3 is a fractional angular view on a larger scale and with certain dimensions exaggerated for purposes of explanation of a preferred cutting surface adhered to a conductive supporting surface; and Fig. 4 is a fractional vertical cross section on a greatly enlarged scale taken on the line IV—IV of Fig. 3 and showing the character of the cuts formed in the cutting surface.

Figure 1:
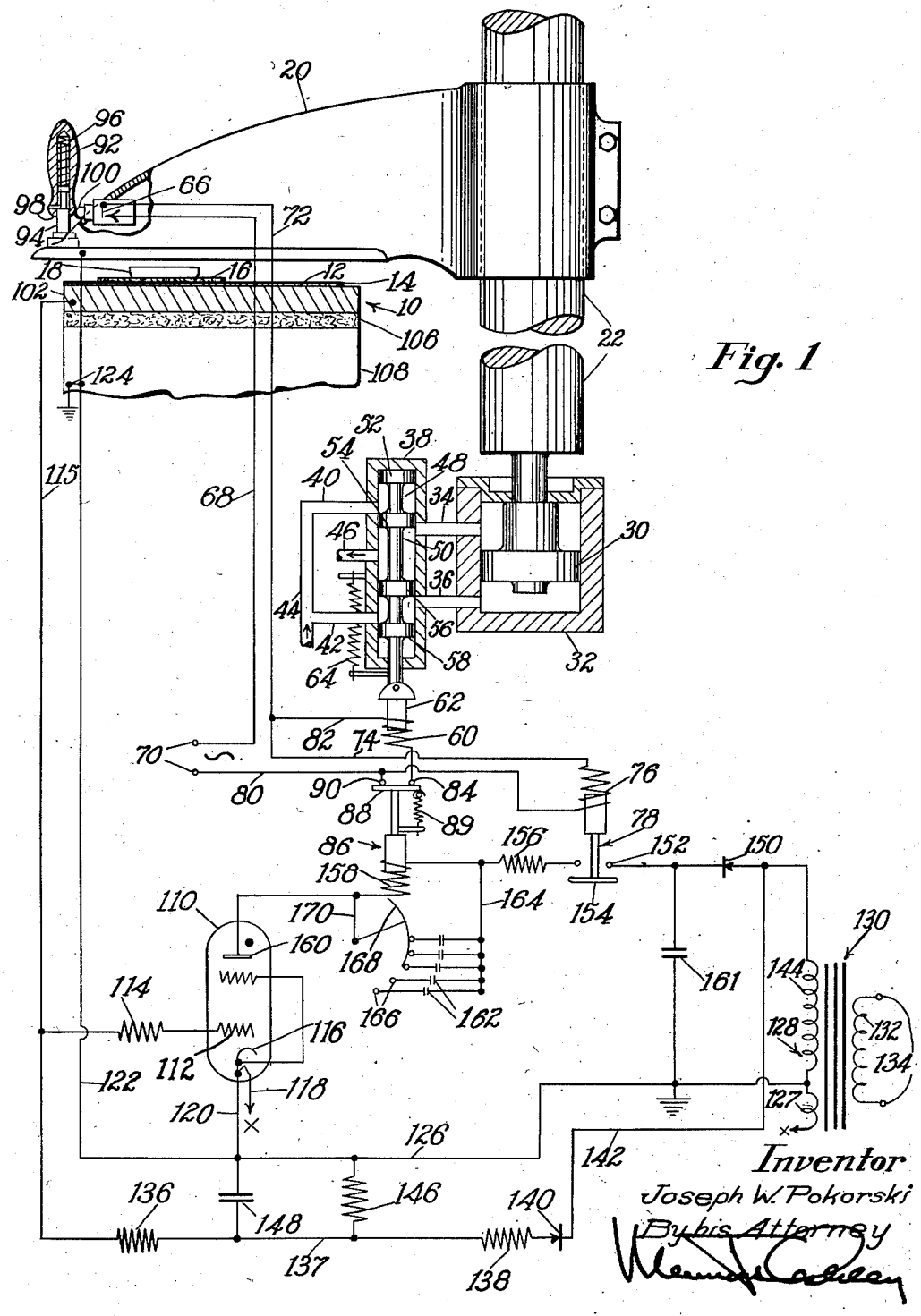

The illustrated machine comprises a work support including a support member 10 having an electrically conductive surface portion 12 and a primary cutting surface layer 14 of dielectric material secured to the surface portion 12. Sheet material 16 such as leather, cloth, paper, metal foil or other material to be cut is laid on the primary cutting surface layer 14 to be operated upon by a freely movable die 18 to produce blanks. The die is forced through the material 16 and primary cutting surface layer 14 and against the surface portion 12 by a platen or beam 20 mounted upon a vertical spindle 22 at one side of the bed for swinging movement across the bed into operative position over the die and arranged for reciprocation toward and away from the bed in a pressure applying operation upon the die.

In the structure shown the cutting layer 14 is adhered over its entire adjacent surface to the electrically conductive surface portion 12 to insure that areas 15 of the cutting layer separated by lines of cut from the remaining portions of the layer will remain in place and the layer will continue to present a reasonably flat and continuous face. The cutting layer 14 may be composed of any of a variety of firm non-conductive materials which are penetrable by a die under the pressure applied by the platen. Fibrous sheet materials such as kraft or other firm papers and various sheet plastic materials are useful in this relation. Alternatively, the cutting layer may be an adherent coating which may be applied to the surface portion 12 from a liquid vehicle or as a hot melt. Suitable coatings include natural or synthetic rubber solutions such as compounded rubber cements, and also varnishes, shellac and resinous coatings.

Special advantages are obtained through the use of a laminated paper cutting layer 14' (see Figs. 3 and 4) in combination with the conductive platen, die and conductive surface of the support member. This sheet comprises at least two layers 24 of firm, tough paper joined by a film of pressure-sensitive adhesive 26 between their adjacent faces to hold them together. It has been found that the pressure-sensitive adhesive prevents or reduces chipping out of portions of the fibrous sheet where successive cuts are close together so that the life of the cutting surface layer is substantially greater than where a simple sheet of material is employed. The pressure-sensitive adhesive film gives the added advantage in cutting fibrous materials such as leather that fibers 27 torn from the cut edges of the leather by the cutting die are trapped by the adhesive 26 and improve the cutting characteristic of the cutting surface layer.

It is preferred also to employ a layer 28 of pressure-sensitive adhesive to hold the cutting surface layer, whether a single sheet or a laminated sheet, against the conductive surface 12. Use of pressure-sensitive adhesive for this purpose augments or provides a chip preventing and fiber trapping action as discussed above.

Additionally, where a pressure-sensitive adhesive is employed it becomes a relatively simple matter to remove the cutting surface layer when it has been worn out through excessive cutting.

Conventional rubber base pressure-sensitive adhesives may be employed; but it has been found possible to employ water-soluble pressure-sensitive adhesives, for example polyvinyl methyl ether. Such adhesives display the desired relatively strong, aggressive pressure-sensitive adhesive action and possess the added characteristic that fibrous sheets adhered to a conductive surface may be readily and completely removed by applying water to soften the adhesive and enable stripping of the sheet material from the conductive surface. Also, adhesive residue on the conductive surface may be removed by a simple washing with water.

A cutting surface layer 14' (see Figs. 3 and 4) which has been found particularly satisfactory comprises two layers 24 of creped kraft paper each of which is approximately 0.010" in thickness, the layers being held together by a film 26 of polyvinyl methyl ether pressure-sensitive adhesive approximately 0.005" in thickness. This laminate was secured to a conductive surface by a layer 28 of adhesive approximately 0.005" in thickness. It was found that with the cutting press including this dielectric surface layer many thousand cuts could be made before the cutting surface layer deteriorated to a point where its replacement was desirable.

The platen 20 of the press is preferably reciprocated by hydraulic power means. To this end, the lower portion of the spindle 22 carries a piston 30 slidably mounted in a cylinder 32 having fluid passages 34 and 36 connecting upper and lower portions of the interior of the cylinder above and below the piston to a valve casing 38. The interior of the casing is connected to upper and lower fluid inlet passages 40 and 42 extending to a fluid supply source 44. The central portion of the valve casing is provided with a fluid exhaust passage 46. Within the valve casing is slidably mounted a valve 48 comprising a valve rod 50 carrying four pistons 52, 54, 56, 58. The piston 52 is mounted at the upper end of the rod 50 and is operable to engage the upper end of the casing to limit upward movement of the valve. Piston 58 is located near the lower end of the rod and is operable to limit downward movement of the valve. The pistons 54 and 56 are located upon opposite sides of the exhaust passage 46 and are so spaced from each other that when the valve is up fluid flows from the source 44, through passage 42, into the casing between pistons 56 and 58, through passage 36 into the lower portion of the cylinder 32 thus to force the piston, spindle, and platen upwardly. At this time fluid from the upper portion of the cylinder is exhausted through passage 34, through the space between the pistons 54 and 56, and out the exhaust passage 46. By this means the platen 20 is normally maintained in position above the bed and spaced therefrom by a distance somewhat greater than the maximum height of the die used plus the maximum thickness of the work to be operated upon.

The platen is brought down upon the work as a result of moving the valve to its lower position. When this occurs fluid passes from the source 44 through passage 40, through the space between pistons 52 and 54, through the passage 34 into the upper portion of cylinder 32, causing downward movement of the piston. Fluid from the lower portion of the cylinder flows through passage 36, through the space between pistons 54 and 56 into the exhaust passage 46.

In the preferred operation of the machine the piston 30 does not descend to the bottom of the cylinder 32 to complete its maximum stroke but is arrested and its movement reversed by moving the valve again to its upper position as will be hereinafter described.

The valve is controlled by a solenoid 60 having a plunger 62 connected to the lower end of the valve rod 50. When the solenoid is energized the plunger is pulled downwardly to move the valve into its lower position resulting in downward movement of the piston and of the platen toward the work. When the solenoid 60 is deenergized the valve is returned to its upper position by a spring 64. When this occurs the movement of the platen is reversed as above described.

It is to be understood that the platen actuating structure thus far described is typical and that other means for actuating the platen, such as mechanical means, might be employed. It is highly desirable, however, that the platen actuating means be responsive to a readily controlled member such as the solenoid here illustrated.

In the present instance it is proposed to operate the solenoid in such manner that the movement of the platen is reversed and the platen is then caused to move away from the work very quickly after the die has passed through the work and primary cutting surface layer, and has been pressed against the electrically conductive surface portion 12. To accomplish this the solenoid is placed in a manually operable control circuit which is in turn controlled by a second circuit which is completed when the die has passed through the cutting surface layer into contact with the conductive surface portion 12, this second circuit extending through the platen 20, die 18 and electrically conductive surface portion 12 of the support member 10. It will be seen that this circuit is activated to reverse the movement of the platen as a result of the operation of the platen itself and that reversing action is initiated only after the edge of the die has passed completely through the work a distance determined by the thickness of the cutting layer.

The manually operable control circuit for initiating operation of the power means to move the platen downward includes a switch 66 one side of which extends through a lead 68 to an A. C. power source 70. The other side of the switch through leads 72 and 74 extends to a coil 76 of a relay 78 in an automatic control circuit and thence through lead 80 back to the power source. A lead 82 connects the lead 72 to one end of the solenoid 60, the other end being connected to a contact 84 of a relay 86 also in the automatic control circuit. The relay 86 has an armature 88 normally held by a spring 89 in its illustrated position to bridge the contact 84 and a second contact 90 connected to the power source.

The circuit through the solenoid is operated by a handle 92, mounted upon a pin 94 at the outer end of the platen 20, and by which the platen can be swung about the axis of the spindle. The handle is slidable vertically of the pin and is normally held in raised position by a spring 96. The lower end of the handle is beveled at 98 and adapted to engage, when depressed, a push button 100 for closing the switch 66. Thus depression of the handle 96, at such time as the relay 86 is closed, results in energization of the solenoid 60 to effect downward movement of the platen.

The automatic control circuit extends through the platen, die and electrically conductive surface portion 12 of the support member 10. As is customary, the platen and die are composed of metal such as iron, steel or aluminum, and are therefore electrically conductive. Dies of non-conductive material, for example a rigid plastic, may be used provided a conductor between the upper and lower face is incorporated. The support member 10, as shown in Fig. 2, comprises a rigid body, the upper surface 12 of which is electrically conductive. The conductive surface may be in the form of a plate 102 of a relatively soft metal such as zinc or aluminum or other electrically conductive material such as a conductive composition of a natural or synthetic rubber or resin having conductive particles, e. g. carbon black, therein. A primary cutting surface layer 14 of dielectric material is secured, preferably by means of adhesive, to the surface 12. The plate 102 provides a stiff backing for the primary cutting surface layer 14 and the layer 14 itself provides a direct work support which can readily be penetrated by the edges of the die. Since the control circuit is not complete until penetration of the layer 14 by the die, the edges of the die will be pressed strongly against the electrically conductive surface portion 12 of the plate 102 and it is preferred to use a plate of relatively soft metal such as aluminum. The plate 102 rests upon a sheet of insulating material 106 such as fiberboard which in turn rests upon a portion 108 of the machine frame.

The automatic control circuit shown includes a gas tetrode tube, or thyratron 110, having a control grid 112 connected through a limiting resistance 114 and a lead 115 to the plate 102 of the cutting bed.

The cathode 116 is connected to one side of filament 118 and to a lead 120. Another lead 122 extends from lead 120 to the platen 20 and is grounded to the frame at 124. A lead 126 extends from lead 120 to a filament current supply section 127 of the secondary 128 of a transformer 130, the primary 132 of which is connected to a 114 volt source 134 of alternating current. The lead 115 is connected through a grid bias D. C. supply including a limiting resistor 136, lead 137, voltage dropping resistor 138 to a rectifier 140 and from thence by a lead 142 to one side of a plate current supply section 144 of the transformer secondary. The other side of the section is grounded through lead 126. The leads 126 and 137 are connected by a voltage dropping resistor 146 and through a filter condenser 148. The plate circuit extends from the transformer section 144 through a rectifier 150 across contacts 152 of the relay 78, when the armature 154 thereof is closed, and through a current limiting resistor 156, through a coil 158 of the relay 86, to the plate 160 of the tube 110. A filter condenser 161 connects the upper portion of the plate circuit to ground.

Bridging the relay coil 158 are a plurality of capacitors 162 each having one side connected to a lead 164 extending to one end of the coil 158, and the other side being connected to one of the contacts 166 associated with a curved switch arm 168 joined by a lead 170 to the other end of the coil 158. This switch arm first bridges the coil 158 with one capacitor. Added movement of the arm adds more capacitors into a parallel circuit where their capacities are added together, increasing the time required for building up the needed voltage across the relay coil 158 to operate it. The capacitors 162 constitute a time delay device for delaying the flow of plate current through the coil 158 and provide selectively time-variable means by which deenergization of the solenoid 60 is controlled. The values of the capacitors are so chosen that a variable time delay, in operating the relay 82, of from about 5 to 200 milliseconds is obtainable. For example, each capacitor may have a value of 10 microfarads.

Thus by varying time of operation of relay 82 to open the circuit through relay 76, the time at which the spring 64 may move the valve upwardly following electrical contact of the die with the electrically conductive surface portion 12, can be varied. As a result of this, pressure against or depth of penetration of the die into the plate 102 can be controlled over a wide range. It is to be understood that in most cases, cutting is complete when the edge of the die has penetrated through the cutting surface layer 14 and no time delay is needed. In such cases, the time delay elements of the control circuit, e. g. the capacitors 162, may be eliminated.

In the operation of the machine, assuming the parts to be in the position shown in Fig. 1, when the starting handle 92 is depressed closing the switch 66, the coil 60 is energized effecting downward movement of the valve 48. Fluid then flows through passages 40 and 34 to the upper portion of the cylinder 32 forcing the piston 30 and the spindle 22 downwardly. Downward movement of the spindle causes movement of the platen 20 down into engagement with the die 18 and forces the latter through the material 16 and cutting surface layer 14 to produce a blank.

Upon closing switch 66 current also passes through coil 76 closing relay 78 in the plate circuit. After the die passes through the material and cutting surface layer it engages the conductive upper surface 12 of the support member 10 bringing the grid potential to ground or zero where the grid bias is less negative and the tube fires or becomes conductive. After a time delay of not more than a few milliseconds dependent upon the capacity in the delay circuit, the voltage builds up across the coil 158 resulting in opening the relay 86 and the deenergization of the solenoid 60. When the relay opens, the spring 64 returns the valve 48 to its upper position and fluid flows through passages 42 and 36 into the lower portion of the chamber forcing the piston 30 upward with the result that the downward stroke of the platen is arrested and then the platen is moved in a direction away from the bed.

As long as the handle 92 is held down relay 78 remains closed which results in holding the circuit through relay contacts 84 and 90 open, and the solenoid 60 remains deenergized thus preventing further operation of the platen. Release of the handle 92 opens the switch 66 and deenergizes the relay 78 with the result that switch armature 154 drops, opening the plate circuit and permitting the relay 86 to close the circuit through the solenoid 60. After release of handle 92 the switch 66 is opened and the parts return to the positions shown in Fig. 1, reset for a subsequent cycle of operation.

From the foregoing description it will be observed that the press is provided with a control for automatically limiting the stroke of the platen through means responsive to engagement of the die with the cutting block and, consequently, independently of the height of the die used. It will further be observed that the thickness of the cutting layer 14 alone or in combination with the variable time delay relay for initiating actuation of the power means in arresting the platen provides for the control of the distance traveled by the die after passing completely through the workpiece with the advantages above enumerated.

Having thus described my invention, what I claim as new and desire to secure by Letters Patent of the United States is:

1. In a press comprising a support member having an electrically conductive surface portion, a die, a platen mounted for movement toward and away from said support member in producing pressure applying operations upon the die, said die and platen being electrically conductive, power means for reciprocating the platen, means for initiating operation of the power means to move the platen toward the support member, means for initiating operation of the power means to move the platen away from the support member, and means for actuating the last-mentioned intiating means comprising an electrical control circuit through the platen, die and support member, a firm work support dielectric surface layer secured to said support member and disposed between said die and said support member to insulate said die from the electrically conductive surface portion of said support member, said dielectric layer being composed of material penetrable by said die under pressure applied by said platen in a pressure applying operation to allow contact of said die with said electrically conductive surface portion of the support member, whereby said control circuit becomes complete and operative to actuate said last-mentioned initiating means only after penetration of said dielectric layer by said die.

2. In a press comprising a support member having a relatively soft metal surface portion, a die, a platen mounted for movement toward and away from said support member in producing pressure applying operations upon the die, said die and platen being electrically conductive, power means for reciprocating the platen, means for initiating operation of the power means to move the platen toward the support member, means for initiating operation of the power means to move the platen away from the support member, and means for actuating the last-mentioned initiating means comprising an electrical control circuit through the platen, die and metal surface portion of said support member, a firm work support dielectric coating adherent to said support member and disposed between said die and said support member to insulate said die from the metal surface portion of said support member, said dielectric coating being composed of material penetrable by said die under pressure applied by said platen in a pressure applying operation to allow contact of said die with said metal surface portion of the support member, whereby said control circuit becomes complete and operative to actuate said last-mentioned initiating means only after penetration of said dielectric coating by said die.

3. In a press comprising a support member having a relatively soft metal surface portion, a die, a platen mounted for movement toward and away from said support member in producing pressure applying operations upon the die, said die and platen being electrically conductive, power means for reciprocating the platen, means for initiating operation of the power means to move the platen toward the support member, means for initiating operation of the power means to move the platen away from the support member, and means for actuating the last-mentioned initiating means comprising an electrical control circuit through the platen, die and metal surface portion of said support member, a fibrous dielectric work support surface layer adhesively bonded over its adjacent face to the surface portion of said support member and disposed between said die and said support member to insulate said die from the metal surface portion of said support member, said fibrous dielectric layer being composed of material penetrable by said die under pressure applied by said platen in a pressure applying operation to allow contact of said die with said metal surface portion of the support member, whereby said control circuit becomes complete and operative to actuate said last-mentioned initiating means only after penetration of said dielectric layer by said die.

4. In a press comprising a support member having a relatively soft metal surface portion, a die, a platen mounted for movement toward and away from said support member in producing pressure applying operations upon the die, said die and platen being electrically conductive, power means for reciprocating the platen, means for initiating operation of the power means to move the platen toward the support member, means for initiating operation of the power means to move the platen away from the support member, and means for actuating the last-mentioned initiating means comprising an electrical control circuit through the platen, die and metal surface portion of said support member, a work support dielectric member adhesively bonded over its adjacent face to the surface portion of said support member and disposed between said die and said support member to insulate said die from the surface of said support member, said dielectric member comprising a laminate of at least two fibrous dielectric sheets joined over their adjacent faces by pressure-sensitive adhesive and being penetrable by said die under pressure applied by said platen in a pressure applying operation to allow contact of said die with said metal surface portion of the support member, whereby said control circuit becomes complete and operative to actuate said last-mentioned initiating means only after penetration of said dielectric member by said die.

5. In a press comprising a support member having a relatively soft metal surface portion, a die, a platen mounted for movement toward and away from said support member in producing pressure applying operations upon the die, said die and platen being electrically conductive, power means for reciprocating the platen, means for initiating operation of the power means to move the platen toward the support member, means for initiating operation of the power means to move the platen away from the support member, and means for actuating the last-mentioned initiating means comprising an electrical control circuit through the platen, die and metal surface portion, a work support dielectric member bonded over its adjacent face to the surface portion of said support member by pressure-sensitive adhesive and disposed between said die and said support member to insulate said die from the metal surface of said support member, said dielectric member comprising a laminate of at least two dielectric paper sheets joined over their adjacent faces by pressure-sensitive adhesive and being penetrable by said die under pressure applied by said platen in a pressure applying operation to allow contact of said die with said metal surface portion of the support member, whereby said control circuit becomes complete and operative to actuate said last-mentioned initiating means only after penetration of said dielectric member by said die.

References Cited in the file of this patent
UNITED STATES PATENTS

| | | |
|---|---|---|
| 376,541 | Mergenthaler | Jan. 17, 1888 |
| 527,988 | Hunter | Oct. 23, 1894 |
| 1,862,633 | Ramsay | June 14, 1932 |
| 1,905,099 | Jay | Apr. 25, 1933 |
| 2,409,397 | Sheehan | Oct. 15, 1946 |
| 2,516,798 | Jensen | July 24, 1951 |
| 2,652,351 | Gerhardt | Sept. 15, 1953 |
| 2,674,555 | Pahl | Apr. 6, 1954 |
| 2,674,556 | Pahl | Apr. 6, 1954 |